Figure 1:
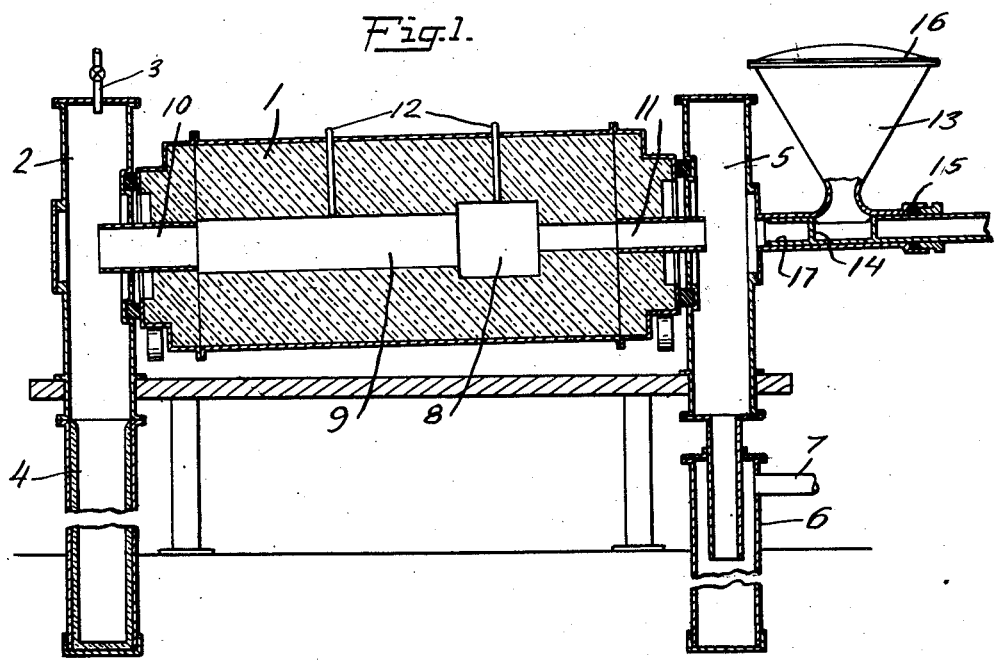

July 14, 1931.  F. S. LOW ET AL  1,814,392

CHLORINATION OF FERROCHROME

Filed Jan. 7, 1929

Frank S. Low
Maurice C. Taylor
J. K. Berresford

INVENTORS

BY Pennie Davis Marvin Edmonds

ATTORNEYS

Patented July 14, 1931

1,814,392

UNITED STATES PATENT OFFICE

FRANK S. LOW, MAURICE C. TAYLOR, AND JOHN K. BERRESFORD, OF NIAGARA FALLS, NEW YORK, ASSIGNORS, BY MESNE ASSIGNMENTS, TO FRANK S. LOW, OF NIAGARA FALLS, NEW YORK, AND A. W. BERRESFORD, OF DETROIT, MICHIGAN

CHLORINATION OF FERROCHROME

Application filed January 7, 1929. Serial No. 330,707.

This invention relates to improvements in the chlorination of ferrochrome and it comprises an improved process of chlorinating ferrochrome in which the ferrochrome is supplied to a suitable furnace and subjected to chlorination to establish and maintain a fused bath of ferrous chloride and chromous chloride in contact therewith, the resulting mixture of ferrous and chromous chlorides being drawn off and separated from the unchlorinated ferrochrome while still in a fused state and then subjected to further chlorination for the production of ferric and chromic chlorides therefrom.

In the improved process of the present invention the chlorination is divided into two separate and more or less distinct operations. In the first operation the ferrochrome is chlorinated in the presence of a fused bath of ferrous and chromous chlorides and the ferrochrome is itself converted into ferrous and chromous chlorides which join the fused bath. In the presence of an excess of unchlorinated ferrochrome the fused bath will be made up mainly of ferrous and chromous chlorides with but little ferric or chromic chloride formed. In the second operation the fused ferrous and chromous chlorides are separated from the zone in which ferrochrome is present and are subjected to a further chlorination while still maintained in a fused state to convert the ferrous and chromous chlorides into ferric and chromic chlorides. These two successive operations are carried out as part of a complete process in which the fused ferrous and chromous chlorides produced in the first operation in the presence of ferrochrome are subsequently further chlorinated in the absence of ferrochrome to produce the ferric and chromic chloride.

The present process can advantageously be carried out in a continuous manner in a suitable furnace, such as a rotary or oscillating furnace, in which two separate reaction zones are maintained, with a fused bath of ferrous and chromous chlorides and excess ferrochrome in one reaction zone for carrying out the first operation and with further chlorination of the ferrous and chromous chlorides in another zone of the furnace in the absence of ferrochrome. By supplying ferrochrome continuously or intermittently to the first reaction zone and by causing the ferrous and chromous chlorides to flow, in a continuous or intermittent manner, to the second reaction zone, and by suitably supplying chlorine for the successive chlorinations, the chlorination can be made continuous, with continuous production of ferric and chromic chlorides and continuous discharge thereof from the furnace.

The present process is carried out at a high temperature, around 800° C. or higher, so as to maintain the ferrous and chromous chlorides in a fused state and prevent their solidification. If the temperature falls too low, these chlorides solidify and interfere with the further progress of the chlorination. In order to prevent such solidification and maintain the chlorides in a fused state, the temperature in the reaction zone should be kept around 800 to 820° C. or higher. Ferrochrome can readily be chlorinated in the presence of such a fused bath. Some ferric chloride and/or chromic chloride may be formed, but the reducing effect of the ferrochrome appears to prevent any considerable formation of such chlorides so long as an excess of ferrochrome is present. When, however, the mixture of ferrous and chromous chlorides flows from the first reaction zone to the zone of further chlorination, they are readily chlorinated in the absence of ferrochrome to form the ferric and chromic chlorides.

The ferrochrome is advantageously supplied to the process in a finely divided form, for example, in the form of particles which for the most part pass through a 20 mesh screen. The ferrochrome is heavier than the ferrous and chromous chlorides, and, by providing an enlarged portion of the rotary or oscillating furnace for the first reaction zone, the ferrochrome can be kept behind in this reaction zone while permitting the excess of ferrous and chromous chlorides, as produced, to flow to the second reaction zone to be further chlorinated.

The chlorination of ferrochrome to form ferrous and chromous chlorides is strongly exothermic, and the further chlorination of the ferrous and chromous chlorides to form ferric and chromic chlorides is also exothermic. At the outset, it is sufficient to supply heat to start the reaction, but after the reaction has started, sufficient heat is evolved by the process to maintain the ferrous and chromous chlorides in a fused state, if the furnace is heavily insulated to avoid or minimize heat losses, so that the temperature is maintained above that at which the ferrous and chromous chlorides will solidify, and at which they will be maintained in a sufficiently fluid state. Temperatures considerably in excess of the minimum temperature (around 800 to 820° C.) can be employed, for example, temperatures up to 900° C. or 1000° C.

In the continuous carrying out of the process, with continuous or intermittent supply of ferrochrome, and with continuous or intermittent removal of the ferric and chromic chlorides, suitable provision should be made to maintain a substantial gas-tight operation so as to prevent escape of chlorine and also prevent leakage of air into the furnace.

When the process is carried out in a continuous manner in a rotary furnace or in an oscillating furnace, the chlorine can be introduced and caused to flow through the furnace in a concurrent direction with the furnace charge, or in a countercurrent direction. With countercurrent flow, the ferric chloride produced will be volatilized and carried away with the excess current of chlorine gas, while the chromic chloride will be discharged from the other end of the furnace. In concurrent operation, the chlorine and ferrochrome will be charged into the same end of the furnace and the ferric and chromic chlorides will be discharged from the other end of the furnace.

At the furnace temperatures at which the present process is carried out, the ferric chloride will be volatilized and will be carried out of the furnace to a suitable condenser. The chromic chloride may also be volatilized to a greater or less extent, depending upon the temperature of the operation. If the temperature is sufficiently high to volatilize a considerable part of the chromic chloride so that it escapes from the furnace admixed with the ferric chloride, the admixed chlorides can be fractionally condensed by passing them successively through condensers at progressively lower temperatures, or they can be condensed together to form a mixture of the chromic and ferric chloride which can then be further separated, for example, by leaching the ferric chloride from the chromic chloride. By regulating the temperature, however, the chromic chloride can be for the most part or completely retained in an unvaporized state so that it is discharged from the furnace as a solid, and, in this case practically complete separation of the vaporized ferric chloride from the unvaporized chromic chloride can be effected.

The chromic chloride discharged from the furnace should be cooled to a temperature below that at which it will be oxidized or changed by contact with the air, e. g. or temperature around 250° C. or lower, before it is permitted to come into contact with the air. This can readily be accomplished by discharging the chromic chloride into a discharge receptacle in which it is permitted to accumulate and from the bottom of which it is withdrawn after cooling.

The invention will be further described in connection with the accompanying drawings showing suitable types of apparatus for carrying out the process, but it is intended and will be understood that the invention is illustrated thereby but is not limited thereto.

Figure 2:
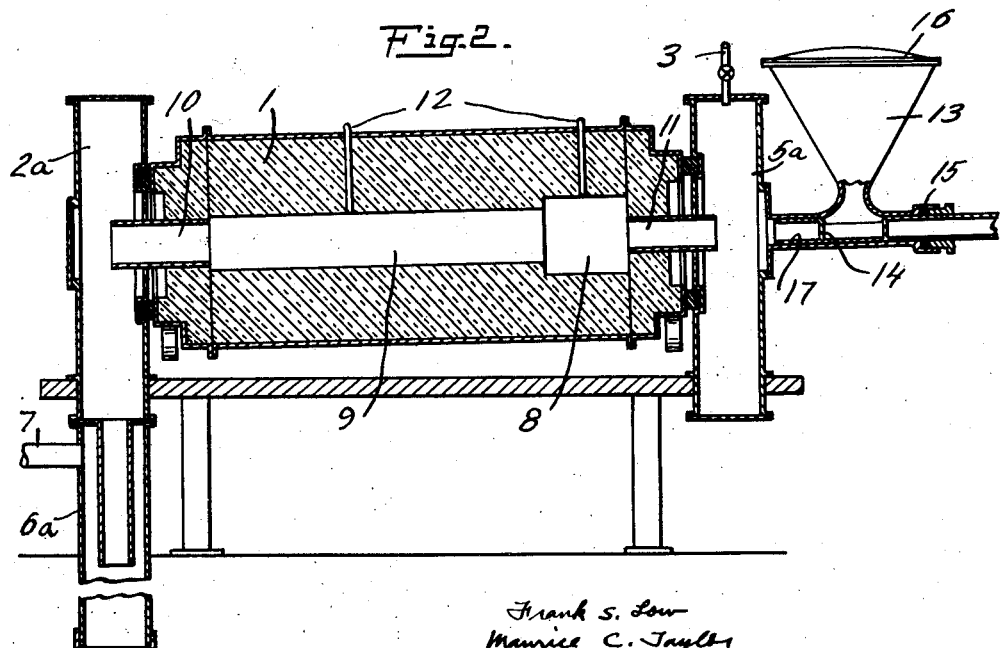

In the accompanying drawings, Fig. 1 shows, in a somewhat convenional and diagrammatic manner, a rotary or oscillating furnace adapted for countercurrent operation, and Fig. 2 is a similar view of a furnace adapted for concurrent operation. Corresponding parts are indicated by the same reference characters.

Referring first to the furnace of Fig. 1, the element 1 is shown as an oscillating or rotating furnace chamber or reaction vessel having an outer metal shell and a heavy insulating lining of refractory material. This furnace chamber or reaction vessel is capable of oscillation or rotation by means not shown and is given a slight inclination to permit forward feed of materials. At its lower end it enters the vertical casing 2 having a chlorine inlet pipe 3. As shown, this casing is relatively tall and narrow and terminates at the bottom in a receiving casing 4 in such a way as to limit the flow of material from it. This casing serves as a receptacle for the chromic chloride and may be lined with tile.

At the other end of the furnace chamber is provided a vapor flue 5, leading to the cooling chamber or condenser 6 for the ferric chloride. The discharge flue 7 leads to a scrubbing tower (not shown) and to a suitable suction producing device (not shown).

The furnace structure 1 has an enlarged reaction chamber 8 and a second reaction chamber or zone 9 of smaller diameter, but the chamber 9 is of somewhat larger diameter than the exit tube 10 and this exit tube in turn is of somewhat larger diameter than the inlet 11 through which the ferrochrome is charged and through which the ferric chloride vapors escape. The arrangement is such that ferrochrome charged into the reaction chamber 8 will be retained in this chamber and prevented from passing to the second reaction chamber or zone 9 by the greater diameter of the chamber 8. The ferrochrome being heavier than the ferrous and chromous chlorides will remain at the bottom of the chamber 8 and will be prevented by the greater depth of this chamber from passing into the second reaction chamber or zone. The greater diameter of the chamber or zone 9 than that of the exit tube 10 will prevent discharge of chromic chloride until the level in the chamber 9 is above the bottom of the exit tube. The still smaller diameter of the inlet opening 11 permits the charging of ferrochrome without interfering with the furnace charge. Pyrometers 12 extend through the furnace wall and lining, one or more pyrometers being provided for the reaction chamber 8 and for the second reaction chamber 9.

Any suitable feeding device for feeding ferrochrome may be employed, one suitable plunger type of feeding device being shown. The ferrochrome is supplied in a finely divided state from the hopper 13 and small portions thereof are supplied by the plunger feed device 14 to the reaction chamber, this plunger operating through a suitable packing gland 15 by operating means not shown. The hopper is provided with a cover 16 which also makes a gas-tight connection. The plunger feed device has a reamer 17 for removing any adhering cake from the feedhole and keeping the feedhole open, such cake being carried into the reaction chamber 8. The operation of the plunger is such that a measured portion of ferrochrome is taken from the hopper 13 and fed to the reaction chamber 8 from time to time, depending upon the desired rate of feed of ferrochrome to the reaction chamber.

In the operation of the apparatus of Fig. 1 the furnace should first be heated to a sufficiently high temperature to start the reaction, after which the heat of the reaction can be employed for continuing it. Ferrochrome when charged into the reaction chamber and heated to a sufficiently high temperature reacts rapidly with chlorine. By providing a sufficient thickness of heat insulation in the form of a refractory lining or with added heat insulation if necessary, the exothermic heat of reaction can be prevented from escaping by radiation to a sufficient extent so that additional heat is unnecessary for carrying on the process.

When the ferrochrome charged into the reaction chamber 8 is chlorinated it forms first ferrous and chromous chlorides and these are maintained at a temperature above their melting point so that they form a fused salt bath made up for the most part or entirely of the ferrous and chromous chlorides. The ferrochrome acts as a reducing agent to prevent the formation of any considerable amount of ferric or chromic chloride, or to reduce such chlorides if formed so that, so long as an excess of ferrochrome is present and kept agitated with the ferrous and chromous chlorides the reaction taking place in the reaction chamber 8 will be almost entirely the chlorination of ferrochrome to form ferrous and chromous chlorides which will remain in a fused state.

Commercial ferrochrome contains considerable carbon, and, as the chlorination of particles of ferrochrome progresses, the carbon tends to remain as a porous layer on the outside of the ferrochrome particles. Agitation of the charge, however, tends to remove this layer of carbon and expose fresh surfaces of ferrochrome so that the chlorination can be carried to completion.

As the ferrous and chromous chlorides accumulate the excess overflows into the reaction zone 9 while the ferrochrome is kept behind at the bottom of the reaction chamber 8. In the absence of ferrochrome the ferrous and chromous chlorides are readily chlorinated further to form ferric and chromic chlorides. At the high temperatures of the furnace, e. g. around 800 to 900° C. or higher, ferric chloride readily volatilizes and is carried with the excess chlorine gas through the reaction chamber 8 and the feed pipe 11 to the vapor chamber 5 and then to the ferric chloride condenser 6. The access chlorine gas escapes through the outlet 7 to the scrubber tower (not shown) in which it is recovered.

The chromic chloride, if the temperature is not too high, will remain in an unvaporized state and will accumulate in the chamber 9 until it overflows through the exit tube 10 into the receptacle 4. This chromic chloride will be cooled in the receptacle 4 before it is withdrawn from the bottom of the receptacle and should be cooled to a temperature around 250° C. or lower to prevent oxidation or burning. Special cooling means (not shown) may be provided if necessary.

In case the temperature in the reaction zone 9 is sufficiently high to vaporize chromic chloride, it will be carried with the current of chlorine gas through the reaction chamber 8 and into the feed connection 11. By providing a feed connection of sufficient length the chromic chloride will be for the most part or entirely condensed in this chamber and carried back into the reaction chamber 8, in which case only or mainly ferric chloride will pass to the vapor chamber 5 and condenser 6. If uncondensed chromic chloride passes into the vapor chamber 5 and condenser 6 the ferric chloride will be admixed with chromic chloride and will require subsequent treatment to separate the chlorides from each other.

The apparatus as a whole is substantially gas-tight so as to prevent escape of chlorine or admission of air. The ferrochrome feed device is sealed so that it is substantially gas-tight. The outlet chamber 2 and chromic chloride receptacle 4 are sealed by the accumulated layer of chromic chloride. The connection between the furnace structure 1 and the inlet and outlet compartments 2 and 5 is suitably gasketed at 15 to make a gas-tight connection between the rotating and stationary parts of the apparatus.

In the apparatus of Fig. 2 the chlorine inlet pipe 3 is arranged at the feed end of the furnace and connects with the chamber 5a through which the ferrochrome is fed. The outlet compartment 2a serves as a discharge compartment for both ferric and chromic chlorides. The collector or condenser 6a in this case serves to condense and collect both chromic and ferric chlorides.

In the operation of the apparatus of Fig. 2 the furnace is first heated to the necessary temperature to initiate the reaction, ferrochrome is charged to the reaction chamber 8 and chlorine is introduced in a concurrent direction through the pipe 3. As the chlorination progresses and ferrous and chromous chlorides are formed the temperature is kept above that of solidification so that the excess ferrous and chromous chlorides pass into the second reaction chamber or zone 9 and are further chlorinated to form ferric and chromic chlorides. If the temperature is sufficiently high both the ferric and chromic chlorides may be vaporized and, by providing fractional condensers (not shown), they can be to a greater or less extent separated by fractional condensation to form chromic chloride free or substantially so from ferric chloride and ferric chloride free or substantially so from chromic chloride. It is not necessary, however, to separate the chlorides by fractional condensation and they can both be passed to the collector or condenser 6a where any vaporized chlorides will be condensed and where unvaporized chromic chloride will collect. In this case the admixed ferric and chromic chlorides can be employed as such or subjected to further separation, for example, by leaching the ferric chloride from the difficultly soluble or insoluble chromic chloride.

The chromic chloride produced according to the present process may have admixed therewith varying amounts of carbon contained in the ferrochrome employed. For some purposes this admixed carbon is unobjectionable. Where a carbon-free chromic chloride is desired, the admixture can be treated to separate the carbon from the chromic chloride.

In carrying out the process, the temperature in the reaction chamber 8 should, as previously described, be maintained above that at which the mixture of ferrous and chromous chlorides will solidify, so that they will be kept in a fused condition. This temperature is around 800 to 820° C. but a considerably higher temperature can be employed. The temperature in the second reaction zone 9 should also be kept high so that the ferrous and chromous chlorides will flow into this zone in a fused state and will there be further chlorinated. In some cases there is a tendency for chromic chloride to vaporize and condense and form deposits on the walls of the reaction chamber. These can be prevented or removed by providing suitable tumbling elements in the second reaction chamber which will not be acted upon by the chlorine but which will serve to break up any solid deposits on the walls of the chamber and insure that all of the chromic chloride is discharged therefrom. Any solid deposits forming on the walls of the feed connection 11 will be removed by the reaming device forming part of the feed plunger. Satisfactory operation of the process has been obtained with maintenance of the temperature in the reaction chamber 8 between 800 and 850° C. and with the temperature of the discharging mass of chromic chloride at the exit end of the furnace around 650 to 400° C.

The amount of chlorin employed should be sufficient for carrying out both chlorination steps of the process; the primary chlorination to form ferrous and chromous chlorids and the secondary chlorination to convert these into ferric and chromic chlorids. In general, an excess of chlorin, or admixed inert gas, is desirable to dilute the vapors of ferric chlorid formed and to assist in sweeping from the apparatus to the condenser, though the desirability of this excess depends somewhat upon the particular design of apparatus used. The amount of diluent gases present in, or added to the chlorin is also a factor. The reaction chamber 8 serves to localize the ferrochrome; and to establish and maintain a pool of fused ferrous and chromous chlorids overflowing downwardly. With countercurrent operation in the apparatus of Fig. 1 with a slow flow of pure or nearly pure chlorin, the chlorin as such may be completely consumed by the ferrous and chromous chlorids; the chlorin flow being progressively converted into a flow of gaseous ferric chlorid. This latter reacts with the ferrochrome to form chromous and ferrous chlorid; the latter coming both from the gas and from the ferrochrome. In so operating, ferric chlorid is the primary chlorinating agent and chlorin itself is the secondary chlorinating agent. Such ferric chlorid vapor as is not taken up by the fused bath and does not directly react with the ferrochrome goes forward to exit. In this method of operation there is an imposed cyclic circulation of iron to, from and back to the fused bath; and the ratio of iron to chromium in the bath is greater than that in the ferrochrome. In any form of operation where stratification of the throughflowing gases occurs, this cyclic circulation of iron is a factor since ferric chlorid vapor is considerably heavier than chlorin. The system however quickly comes to equilibrium so that the ferric chlorid vapor flowing forward to output is equivalent to the input of chlorin. Where an excess of chlorin is employed or where the chlorin contains diluent gases, chlorin itself will reach the fused bath and take part in the primary chlorination. Even here however the primary chlorination is in part, in effect, chlorination of ferrochrome by ferric chlorid. With concurrent flow as carried out in the apparatus of Figure 2, the fused bath of ferrous and chromous chlorids takes up chlorin to form chromic and ferric chlorid; both acting as chlorinating agents on the ferrochrome and being again reduced to the "ous" state. Some of the ferric chlorid vapor formed however flows forward with the chlorin. The rest of the chlorin acts upon the flow of ferrous and chromous chlorids, forming vapors of ferric chlorid which leave the chromic chlorid produced and join the chlorin, passing forward. The flow of the fused mixed chlorides becomes progressively richer in chromium.

The net result of the two methods of operation is exactly the same: a fused bath of ferrous and chromous chlorids is established and maintained and in this bath the ferrochrome is chlorinated with production, ultimately, of pure chromic chlorid (which however may, if desired, still contain a little chromous chlorid) and removal of all iron as vapor of ferric chlorid.

From the foregoing description it will be seen that the present invention provides an improved process of chlorinating ferrochrome and of producing ferric and chromic chlorides in which a fused bath of ferrous and chromous chlorides is produced and employed, and that the process comprises two successive operations, in the first of which ferrochrome is chlorinated in the presence of a fused bath of ferrous and chromous chlorides, with the ferrochrome in excess, and in the second of which the fused ferrous and chromous chlorides are further chlorinated in the absence of ferrochrome to form the ferric and chromic chloride. It will further be seen that the successive operations can be carried out in a continuous manner, with continuous or intermittent supply of ferrochrome and with continuous or intermittent discharge of ferric chloride and chromic chloride, and with maintenance of the temperature by the exothermic heat of reaction and by avoiding heat losses so that the necessary high temperatures for maintaining the ferrous and chromous chlorides in a fused state is obtained.

We claim:

1. The method of chlorinating ferrochrome and of producing ferric and chromic chlorides, which comprises subjecting ferrochrome to chlorination in the presence of a fused bath of ferrous and chromous chlorides, separating the ferrous and chromous chlorides thereby producing from unchlorinated ferrochrome while maintaining the same in a fused state, and subjecting the fused chlorides to further chlorination to form ferric and chromic chlorides therefrom.

2. The method of chlorinating ferrochrome and of producing ferric and chromic chlorides in a continuous manner, which comprises supplying ferrochrome to a fused bath of ferrous and chromous chlorides at a temperature in excess of about 800° C. and subjecting the same to chlorination while maintaining an excess of ferrochrome in contact with the fused chlorides thereby producing further ferrous and chromous chlorides, drawing off the excess of fused chlorides as produced, and subjecting the same in the absence of ferrochrome to further chlorination to form ferric and chromic chlorides.

3. The method of chlorinating ferrochrome and of producing ferric and chromic chlorides in a continuous manner, which comprises chlorinating ferrochrome in the presence of a fused bath of ferrous and chromous chlorides at a temperature in excess of about 800° C., agitating the ferrochrome during such chlorination, withdrawing the ferrous and chromous chlorides thereby produced from the zone of such chlorination to another zone free from ferrochrome while maintaining the ferrous and chromous chlorides in a fused state, and subjecting the same to further chlorination to form ferric and chromic chlorides therefrom.

4. The method of chlorinating ferrochrome and of producing ferric and chromic chlorides, which comprises subjecting ferrochrome to chlorination in the presence of a fused bath of ferrous and chromous chlorides thereby producing further ferrous and chromous chlorides, separating the ferrous and chromous chlorides from unchlorinated ferrochrome while maintaining the chlorides in a fused state, and subjecting the fused chlorides to further chlorination to form ferric and chromic chlorides at a temperature such that the ferric chloride will be vaporized and removed while the chromic chloride will be left behind in an unvaporized condition, and separately collecting the ferric and chromic chlorides.

5. The method of chlorinating ferrochrome and of producing ferric and chromic chlorides, which comprises subjecting ferrochrome to chlorination in the presence of a fused bath of ferrous and chromous chlorides at a temperature of about 800 to 1000° C. withdrawing the ferrous and chromous chlorides thereby producing while still at such temperature from the presence of the unchlorinated ferrochrome, and subjecting the chlorides to further chlorination to form ferric and chromic chlorides at a temperature such that the ferric chloride will be vaporized, withdrawing the vaporized ferric chloride, and withdrawing the unvaporized chromic chloride at a temperature of about 650 to 400° C.

6. The method of chlorinating ferrochrome and of producing ferric and chromic chlorides, which comprises establishing and maintaining a fused body of ferrous and chromous chlorides at a temperature in excess of about 800° C. supplying ferrochrome to said body of fused chlorides, agitating the mixture of ferrochrome and of fused chlorides while subjecting the same to chlorination to produce additional ferrous and chromous chlorides from the ferrochrome, withdrawing the excess of ferrous and chromous chlorides as produced to a zone free from unchlorinated ferrochrome and maintained at a sufficiently high temperature to vaporize ferric chloride, subjecting such chlorides to further chlorination to form ferric and chromic chlorides, and collecting the ferric and chromic chlorides so produced.

In testimony whereof we affix our signatures.

FRANK S. LOW.
MAURICE C. TAYLOR.
JOHN K. BERRESFORD.